UNITED STATES PATENT OFFICE.

GUILLAUME DE MONTMOLLIN AND HEINRICH JOSEPH SPIELER, OF BASEL, SWITZERLAND, ASSIGNORS TO "SOCIETY OF CHEMICAL INDUSTRY IN BASLE," OF BASEL, SWITZERLAND.

DYESTUFFS AND PROCESS OF MAKING THE SAME.

1,387,596.  Specification of Letters Patent. Patented Aug. 16, 1921.

No Drawing.   Application filed September 21, 1920. Serial No. 411,737.

*To all whom it may concern:*

Be it known that we, GUILLAUME DE MONTMOLLIN and HEINRICH JOSEPH SPIELER, both citizens of the Swiss Republic, and residents of Basel, Switzerland, have invented new Dyestuffs and Processes of Making Same, of which the following is a full, clear, and exact specification.

We have found that new dyestuffs are obtained by reacting with tetrahalogenmethanes on an alphanaphtholic compound, as for instance alphanaphthol and its derivatives (substitution products) having their 4-position not substituted and containing preferably at least one carboxylic group, in presence of an agent capable of combining with acids, as for instance hydroxids and carbonates of alkali metals, or oxids and hydroxids of earthalkali metals and of magnesium and of a catalyst, as copper, free or bound, that is to say metallic copper or copper compounds.

These new dyestuffs are probably aurins of the naphthalene series and may be employed directly for dyeing purposes or as intermediate products for the manufacture of other dyestuffs. They constitute dark powders dissolving in water on addition of soda lye, and in concentrated sulfuric acid to blue solutions. The new products are particularly valuable, when they are derived from alphanaphthol-2-carboxylic acid. The dyestuffs prepared with this acid dye wool in an acid bath violet-blue tints turning on subsequent chroming to clear blue tints extraordinarily fast to fulling and to potting.

The invention is illustrated by the following examples, the parts being parts by weight:

Example 1.

144 parts of alphanaphthol are dissolved in 400 parts of water to which 320 parts of soda lye of 30 per cent. are added. To the resulting solution 56 parts of tetrachlormethane and 1.4 parts of metallic copper powder are added. The whole mass is stirred until the blue coloration, which is soon produced, does not further deepen. The dyestuff is then precipitated completely by acidifying and purified by redissolving it in dilute soda lye and precipitating it again by addition of common salt. The free acid of the dye is a dark, red-brown powder with metallic luster. It is insoluble in water and dissolves in a cold solution of soda lye and in a solution of sodium carbonate to blue solutions. Its solution in concentrated sulfuric acid is also blue.

Instead of effecting the reaction in the cold, it may be carried out by boiling the reaction mass in a vessel provided with a reflux condenser. If instead of alphanaphthol, alphanaphtholsulfonic acids, as for instance alphanaphthol-6-sulfonic acid or alphanaphthol-8-sulfonic acid be employed, the corresponding sulfo-dyestuffs are obtained.

Example 2.

188 parts of alphanaphthol-2-carboxylic acid are dissolved at 65° C. in a mixture of 525 parts of soda lye of 30 per cent. and 150 parts of water. To the solution obtained are then added 34 parts of tetrachlormethane and 0.2 part of metallic copper powder. The mass is stirred at 65° C. until the dyestuff is formed, that is to say for about 6 to 7 hours.

After neutralization of a corresponding part of the alkali, the dyestuff can be precipitated as di- or trisodium salt by adding common salt, or isolated as sparingly soluble earthalkali or magnesium salt by decomposition with an earth alkali or magnesium salt.

The free acid of the dye constitutes a red-brown powder. It is insoluable in water, soluble in sodium acetate to a violet solution, in an excess of a solution of sodium carbonate to a dull-blue solution in dilute soda lye and in concentrated sulfuric acid to blue-pure solutions.

The new dyestuff forms with the most various metals vivid-blue lakes and dyes wool blue-violet tints turning on subsequent chroming to a blue-pure fast to light and very fast to fulling and to potting.

Example 3.

188 parts of 1-oxy-2-naphthoic acid are dissolved in 1000 parts of alcohol to which 430 parts of soda lye of 30% are added. Then 55 parts of tetrachlormethane are added to the mass and the whole is stirred at ordinary temperature with a copper stirrer until the coloration of the mass does not further deepen. The crystalline dyestuff separated as sodium salt is isolated by filtration and dried.

The same dyestuff is obtained by substituting tetrabrommethane for the tetrachlormethane.

What we claim is:

1. The herein described process for the manufacture of new dyestuffs consisting in reacting with a tetrahalogenmethane on an alphanaphtholic compound having its 4-position not substituted, in presence of an agent capable of combining with acids and of a catalyst.

2. The herein described process for the manufacture of new dyestuffs consisting in reacting with a tetrahalogenmethane on an alphanaphtholderivative having its 4-position not substituted and containing at least one carboxyl group, in presence of an agent capable of combining with acids and of a catalyst.

3. The herein described process for the manufacture of new dyestuffs consisting in reacting with tetrachlormethane on an alphanaphtholderivative having its 4-position not substituted, in presence of an agent capable of combining with acids and of copper.

4. The herein described process for the manufacture of new dyestuffs consisting in reacting with tetrachlormethane on an alphanaphtholderivative having its 4-position not substituted and containing at least one carboyxl group, in presence of an agent capable of combining with acids and of copper.

5. The herein described process for the manufacture of a new dyestuff consisting in reacting with tetrachlormethane on an alphanaphthol-2-carboxylic acid, having its 4-position not substituted, in presence of an agent capable of binding acids and of a catalyst.

6. The herein described process for the manufacture of a new dyestuff consisting in reacting with tetrachlormethane on alpha-naphthol-2-carboxylic acid, in presence of an agent capable of binding acids and of copper.

7. The herein described process for the manufacture of new dyestuffs consisting in reacting with tetrachlormethane on alpha-naphthol-2-carboxylic acid in presence of soda lye and of copper.

8. As new products, the herein described dyestuffs derived from tetrahalogenmethane and an alphanaphtholic compound having its 4-position not substituted, and constituting, in a dry state, dark powders dissolving in water on addition of soda lye and in sulfuric acid to blue solutions.

9. As new products the herein described dyestuffs derived from tetrahalogenmethane and an alphanaphthol derivative having its 4-position not substituted and containing at least one carboxyl group, and constituting, in a dry state, dark powders, dissolving in water on addition of soda lye and in sulfuric acid to blue solutions.

10. As a new article of manufacture, the herein described dyestuff derived from tetrahalogenmethane and alphanaphthol-2-carboxylic acid, constituting a dark powder dissolving in water on addition of soda lye and in concentrated sulfuric acid to a blue solution and dyeing wool in blue-violet tints turning on subsequent chroming to a blue-pure extraordinarily fast to fulling and to potting.

In witness whereof we have hereunto signed our names this 7th day of September, 1920, in the presence of two subscribing witnesses.

Dr. GUILLAUME de MONTMOLLIN.
Dr. HEINRICH JOSEPH SPIELER.

Witnesses:
FRIDA SALADIN,
AMAND BRAUN.